United States Patent
Rininger

[11] 3,810,081
[45] May 7, 1974

[54] SUBMERGED CHAIN ANGLE MEASUREMENT

[75] Inventor: Paul R. Rininger, Westlake Village, Calif.

[73] Assignee: Global Marine Inc., Los Angeles, Calif.

[22] Filed: Nov. 15, 1972

[21] Appl. No.: 306,536

[52] U.S. Cl. .................. 340/3 R, 73/143, 340/3 T, 340/5 R
[51] Int. Cl. ........................ H04b 11/00, G01l 5/04
[58] Field of Search ....... 73/143, 144; 340/3 T, 3 R, 340/5 R, 18 P; 114/144 B

[56] References Cited
UNITED STATES PATENTS
3,722,268  3/1973  Crooke ............................... 73/143
3,614,721  10/1971  Lagoe ............................... 340/5 R Primary Examiner—Richard A. Farley
Attorney, Agent, or Firm—Christie, Parker & Hale

[57] ABSTRACT

The tension in an anchor chain connected to a floating vessel is measured by a chain angle sensing device coupled to the chain below the surface of the water. The chain angle sensing device is submerged at a depth where the sensed chain angle is substantially identical to the chain angle of inclination existing immediately outboard of its point of support on the vessel, but where wave action energy levels have a substantially negligible effect on the rate of change in the sensed chain angle measurement. In one form of the invention, the chain angle sensing device is an acoustic angle indicator for generating a coded acoustical signal representing the chain angle of inclination. A transponder on board the vessel receives the acoustical signal and decodes it to generate an output representing the instantaneous chain angle measurement. In an alternate form of the invention, a sonic reflector engaged with the chain reflects a train of sonic pulses generated by a sonic transponder onboard the vessel. The transponder receives the sonic pulses from the reflector, and generates a signal representing the measured distance between the transponder and the reflector. Triangulation techniques are used in conjunction with the sonar detected distance measurement to generate a signal representing chain angle. Chain tension information is obtained using sensed chain angle information in conjunction with a graphic diagram in which tension is a function of chain angle, or chain tension can be obtained from an onboard computer programmed to generate chain tension information as a function of chain angle.

20 Claims, 5 Drawing Figures

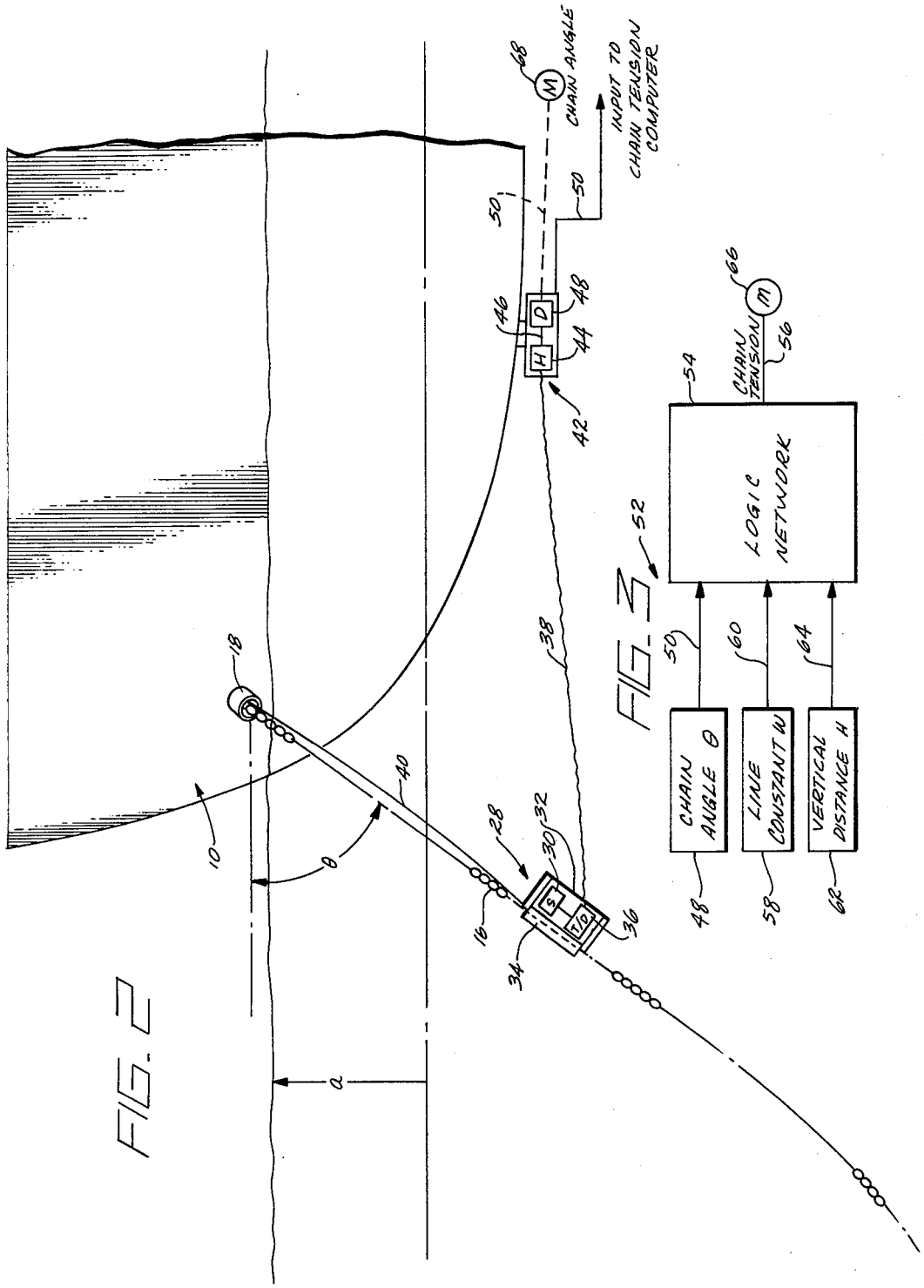

SUBMERGED CHAIN ANGLE MEASUREMENT

BACKGROUND OF THE INVENTION

1. Field of the Invention

This invention relates to mooring systems for vessels, and more particularly to a method and apparatus for measuring the angle of inclination of an anchor chain of a floating vessel in determining the load on the chain.

2. Review of the Prior Art

The operator of a moored floating vessel is often concerned with whether the mooring lines of the vessel are overstressed. Breakage of a mooring line results in the loss of expensive anchors and mooring cable or chain. Obviously, the parting of a mooring line also can place the vessel itself in serious danger.

Attempts have been made in the past to provide a ship operator with an indication of the load on the mooring line. One prior art method includes the use of a tension sensor which includes a load cell and a set of pulleys engaged with the mooring line. However, this method is adaptable for use only with a continuous mooring cable, such as a wire rope line, but is not readily capable of being used to measure tension in a mooring chain.

Strain gauges also have been used to measure tension in mooring lines, but they are not widely or very successfully used to measure loads in a chain.

One system for measuring tension in a chain is disclosed in U.S. Pat. No. 3,722,268 owned by the assignee of the present application. This system is based on the recognition that a mooring line of a marine vessel can be treated as a catenary, i.e., the shape assumed by a perfectly flexible line hanging between two supports. Known mathematical relationships exist which describe the load in a catenary line extending from an anchor submerged in a body of water to a point of support, such as a hawsepipe, located immediately outboard a vessel floating on a body of water. Generally speaking, the variation of the tension in a mooring chain can be continuously determined from these known mathematical relationships if the angle of inclination of the chain at the hawsepipe can be continuously measured.

The tension measuring system in U.S. Pat. No. 3,722,268, includes a shoe coupled to the mooring chain immediately outboard the hawsepipe, chock or fairlead, and a chain angle indicator device carried on the shoe. Chain angle information developed by this system is converted mechanically into a measurement of the instantaneous value of the tension existing in the line next to the hawsepipe.

In this system, chain angle is measured next to the hawsepipe, because the angle existing at that point is one of the parameters necessary to determine line tension from the pertinent mathematical equation. However, the hawsepipe is located near the air/water interface, where the energy level of the wave action is a maximum. Thus, relatively large perturbations are present in the chain angle indicator output, which upsets the accuracy of the chain tension measurement. Moreover, the indicator and shoe often become damaged, since normal wave action constantly batters them against the chain or the hull of the vessel.

SUMMARY OF THE INVENTION

This invention provides a system for sensing a close approximation to the chain angle of inclination existing at the the hawsepipe of a vessel floating on a body of water. The accuracy of the chain angle measurement and the chain angle measuring device itself are both substantially unaffected by wave action.

Briefly, the chain angle measuring system includes a chain angle sensing device coupled to a mooring chain of the vessel at a location substantially below the surface of the water. The angle sensing device is submerged at a depth where the sensed chain angle is substantially identical to the chain angle of inclination existing immediately outboard of its point of support near the hawsepipe, but sufficiently far below the water surface that wave action energy levels produce a substantially negligible effect on the rate of change in the sensed chain angle measurement.

In one form of the invention, the angle sensing device is an active acoustic angle indicator for generating a coded acoustical signal representing the chain angle of inclination at the point where the angle indicator is attached to the chain. The acoustical signal is received by a transponder onboard the vessel and decoded to generate an output representing the sensed chain angle.

In an alternate form of the invention, chain angle is sensed by a submerged passive sonic reflector engaged with the chain. The reflector reflects a train of sonic pulses generated by a sonic transponder onboard the vessel. The transponder receives the sonic pulses from the reflector and generates a signal representing the distance between the transponder and the reflector. Triangulation techniques are then used in conjunction with the sonar detected distance measurement to generate a signal representing the chain angle present at the reflector.

Preferably, chain tension is obtained by modulating the active or passive sensed chain angle signals with additional signals representing the vertical distance between the anchor and the hawsepipe, the payed out length of the chain, and the submerged weight per unit length of the chain. The modulated signal is then applied to a device for visually displaying its value in terms of the tension continuously present in the chain.

Thus, an accurate indication of chain tension can be obtained, because the chain angle sensing device is submerged at a point where the measured chain angle does not depart significantly from the value of the angle existing at the hawsepipe, yet the chain is located far enough below the water surface that the chain angle sensor and its output are not handicapped by wave action.

BRIEF DESCRIPTION OF THE DRAWINGS

These and other aspects of the invention will be more fully understood by referring to the following detailed description and the accompanying drawings in which:

FIG. 2 is an enlarged fragmentary schematic elevation view showing apparatus for indicating the slope of a mooring chain connected to the vessel;

FIG. 3 is a schematic block diagram illustrating an instrumentation system for automatically computing tension in the mooring chain;

DETAILED DESCRIPTION OF THE PREFERRED EMBODIMENTS

The present invention provides systems which enable the personnel on a floating vessel to determine rapidly a close approximation of the angular inclination of a mooring chain near its point of support on the vessel. The chain angle measurement is made at a depth below the water surface where wave action energy levels are relatively insignificant, so that the chain angle measuring device or sensor is not damaged, or its output adversely affected, by wave action. The resultant chain angle information is then combined with information relating to known physical properties and dimensions of the chain mooring system to determine the tension in the chain.

Figure 1:
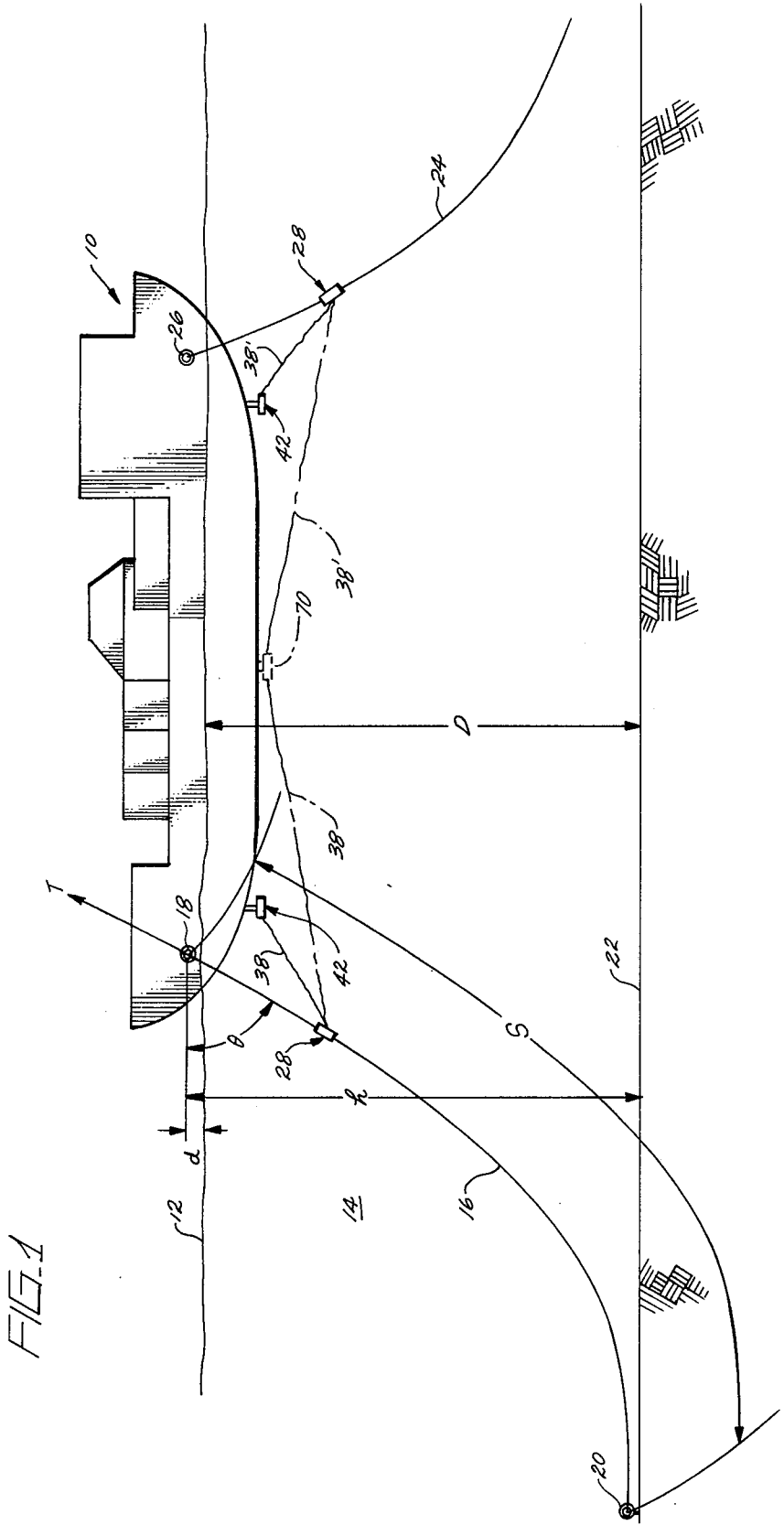
FIG. 1 is a schematic elevation view showing a moored vessel and the parameters pertinent to catenary analysis relative to the vessel mooring systems.

The forces at work in a mooring chain susceptible of forming a catenary curve are described in Mathematics of Physics and Modern Engineering, Sokolnikoff and Redheffer, McGraw-Hill, 1958 at pages 40–42, and Higher Mathematics for Engineers and Physicists, I. S. and E. S. Sokolnikoff, McGraw-Hill, 1941 at pages 245–252. FIG. 1 illustrates the parameters and variables present in a catenary mooring system for a vessel 10 floating on the surface 12 of a body of water 14. The mooring system includes an anchor chain 16 connected to the vessel via a hawsepipe 18 through which the chain is led to a suitable onboard winch (not shown). The bottom of chain 16 is connected to an anchor 20 embedded in an underwater formation 22.

Typically, several mooring lines are used to anchor vessel 10, and a second such anchor chain 24 is shown connected to the vessel through a second hawespipe 26 on the vessel spaced longitudinally from hawespipe 18.

The total length of chain payed by the vessel from hawespipe 18 (or fairlead, or closed chock, if applicable, depending on the type or mooring rigging selected) is indicated by the parameter S. The vertical distance from hawespipe 18, the most outboard point of support of the mooring line by the vessel, to anchor 20 is indicated by parameter $h$, which is the sum of the water depth D and the height $d$ of the hawespipe above the vessel's draft waterline. The tension load in the mooring chain at the hawespipe is represented by the vector T.

The weight of the mooring chain per foot of length in sea water can be determined readily; it is a characteristic of the line, and is referred to herein as parameter $w$. Also, in any given mooring situation the operator of the vessel knows, or has ready means to determine, the length S of line payed out. Parameter $h$ can be determined readily for any given vessel and mooring situation, since water depth D is known either from mariners' charts or from depth soundings, and distance $d$ is a physical property of the vessel. Thus, since the mooring line assumes a predictable catenary path determined by $w$, S, and $h$, it is apparent from the above cited texts that with $w$, S, and $h$, being known, only $\theta$, the angle of declination of the mooring chain at hawespipe 18 from a horizontal reference line, need be known to enable a mathematical determination of the value of T, T being determined by the following equation:

$$T = wh/2 \, [(\cos \theta + 1/\sin \theta)^2 + 1]$$

FIG. 2 illustrates one embodiment of a system for measuring chain angle $\theta$ in preparation for determining the tension load T in the mooring chain at the vessel. An angle sensing device 28 for measuring the declination from horizontal of the mooring chain is engaged with the mooring chain at a point below the water surface. (The construction of sensing device 28 will be described in greater detail below.) Angle sensing device 28 is submerged below the active water area (represented by the distance a in FIG. 2) at a point where the slope of the mooring chain is substantially the same as that existing immediately outboard of hawespipe 18.

In the tension measuring system disclosed in the above-identified U.S. Pat. No. 3,722,268, the angle sensing device and indicator are attached to the mooring chain above the water surface immediately outboard of the hawespipe. However, a major difficulty is that the energy levels of wave action in this area are a maximum, and the resulting pitching and rolling of the ocean and the vessel causes large amplitude variations in the angle indicator output, as well as damage to the sensing device and indicator by constantly battering them against the chain or the hull of the vessel.

The system shown in FIG. 2 overcomes these disadvantages, because angle sensing device 28 is submerged at a location where energy levels from wave action are so low that lateral movement of the sensing device is confined to a relatively small area. Thus, the sensing device is not damaged by impact against the side of the vessel, and large unpredictable perturbations in its output are prevented.

Besides locating the sensing device sufficiently far from the hawespipe that wave action energy levels are minimized, the sensing device also is located sufficiently close to the hawespipe that the slope of the chain where the sensing device is attached closely approximates the chain angle present immediately outboard the hawespipe. Preferably, the sensing device is located where the slope of the chain is within plus or minus 10 percent of the slope existing in the chain at the hawesipe. The typical anchor chain has a relatively constant slope for about the first 30 feet from the hawespipe, and in the section of chain from about 25 to 35 feet below the hawespipe, the wave action energy levels are such that any error caused by wave action is within the normal measurements of the system, i.e., is not the controlling error.

Angle sensing device 28 comprises an acoustic angle indicator which includes a tilt sensor, or sensors, 30 mounted in a water-tight housing 32 attached to the chain. A generally U-shaped elongated shoe 34 which opens toward the chain extends over a plurality of chain links and is releasably secured to the chain by suitable means. Tilt sensors 30 generate an electrical output signal representing the instantaneous angular orientation of the chain. An acoustic transducer-transmitter 36 in housing 32 converts the electrical output of the tilt sensors into a coded acoustical signal represented at 38.

Preferably, the acoustic angle indicator is a modified version of the marine riser angle indicator models ST-2, ST-25, or ST-2505, manufactured by Honeywell Corporation, Marine Systems Center, Seattle, Washington. Preferably, the tilt sensors in such angle indicators are modified to produce an output of zero when the chain is at its design mooring angle. Thereafter, deviations from the design angle generate a transducer output proportional to the angular deviation from the design angle. However, the angle indicator can be modified to produce angular readings relative to other reference planes, such as vertical, without departing from the scope of the invention.

A cable 40 extending downwardly from the vessel holds the angle sensing device at its preselected submerged depth, and also provides means for retrieving the sensing device when required.

Acoustical signal 38 is transmitted through the water to a shipboard receiver or acoustic transponder 42 which includes a hydrophone 44 for converting acoustic signal 38 into a corresponding electrical output signal represented at 46. A decoder 48 decodes signal 46 and produces an electrical output signal 50 having a magnitude proportional to the instantaneous angular orientation of the chain relative to its preselected reference plane.

FIG. 3 illustrates a system 52 onboard the vessel for computing mooring line tension directly from chain angle signal 50. In this system, chain angle signal 50 is applied directly to a computer 54 which contains a logic network for modulating signal 50 to generate a chain tension signal 56 in a manner determined by the logic network and by the output of associated support signal generators. The support signal generators include an adjustable line constant signal generator 58 which produces an output signal 60 having a value representing the magnitude of w for the mooring chain presently being monitored for tension. A second adjustable signal generator 62 produces an output signal 64 representing the value of H for the particular mooring system.

Chain tension signal 56 is applied to a meter 66 having a graduated scale for providing the instantaneous value of the tension T in the particular mooring chain then being monitored. Alternately, computer 54 can be supplied with a strip chart recorder (not shown) for producing a trace (not shown) which may be read to obtain the value of line tension T. As a further alternative, chain angle signal 50 can be fed to a meter 68 for reading chain angle directly. The meter reading can be monitored and periodically used to determine chain tension, or signal 50 can be used to drive a suitable mechanical indicator (not shown) calibrated to constantly monitor chain tension.

There are several methods of providing a continuous measurement of the respective chain angles of the several mooring chains used in a given mooring system. As shown in FIG. 1, a separate one of the submerged angle sensing devices 28 is attached to each mooring chain. In one monitoring method shown in FIG. 1, separate ones of the acoustic receivers 42 are mounted at suitable locations on the hull of the vessel to receive and decode the signals 38, 38', etc., generated by corresponding angle sensing devices 28.

An alternate monitoring method (shown in phantom line in FIG. 1) includes a single acoustic receiver 70 for receiving signals 38, 38', etc., at different time intervals. Preferably, signals 38, 38', etc., are transmitted at different frequencies, and receiver 70 includes a band pass filter which is switched between frequencies to discriminate between signals 38, 38', etc., to decode each signal, one at a time, and produce an output signal which continuously switches between chain angle readings associated with each mooring chain in the mooring system.

Figure 4:
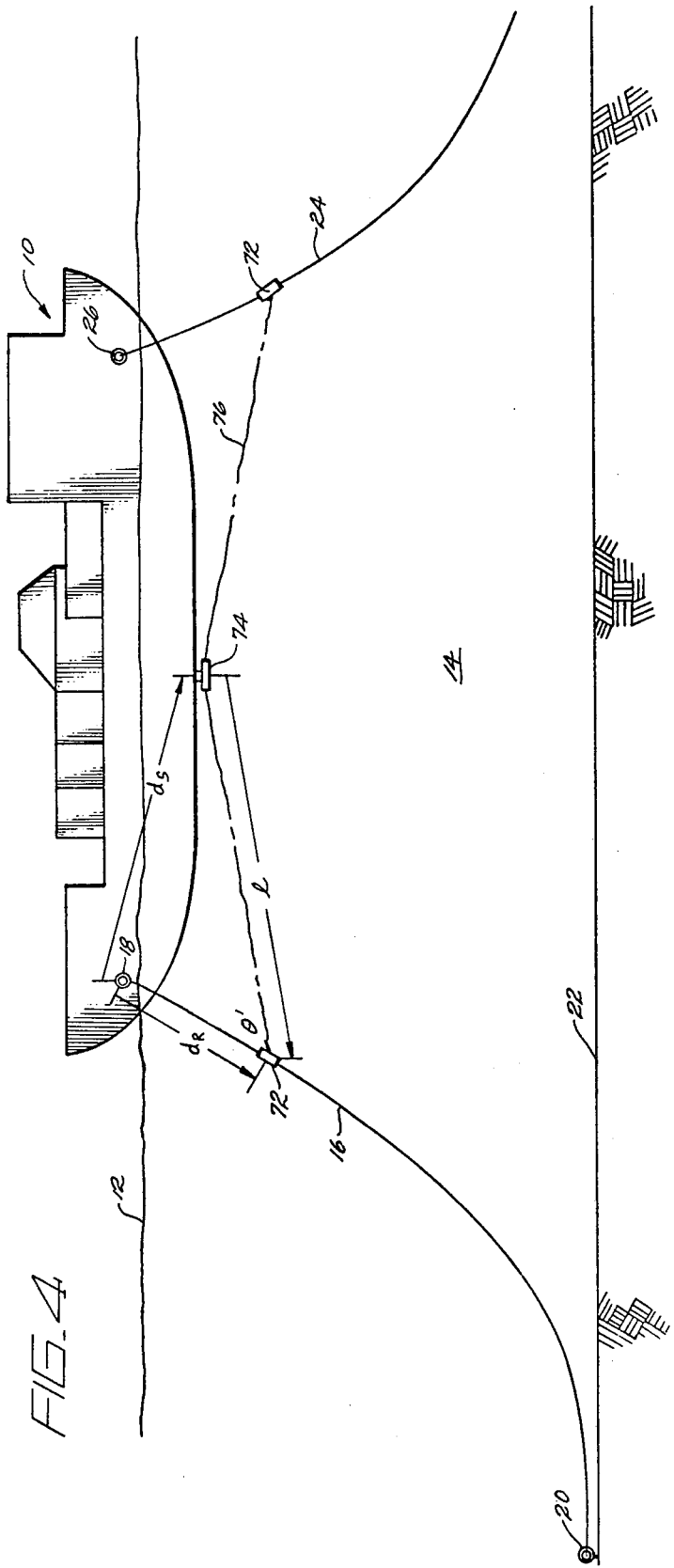
FIG. 4 is a schematic elevation view showing a sonar system for measuring the slope of the mooring chain.

FIG. 4 illustrates an alternate system for measuring chain tension. A separate passive sonar reflector 72 is releasably attached to each mooring chain to be monitored at the same submerged depth where acoustic angle measuring devices 28 are located in the system shown in FIG. 2. A scanning sonar transmitter-receiver or sonar transponder 74 mounted at a central location on the hull of the vessel transmits a train of sonic pulses 76 to each sonar reflector during a given time interval. The sonic pulses are reflected by each reflector back to the transmitter-receiver during the specific time interval when the angular orientation of the reflector's corresponding chain is being monitored. The elapsed time between transmission and reception of the sonic pulses provides means for measuring the distance $l$ between the transmitter-receiver and each reflector.

As the angular orientation of a given chain varies, a corresponding variation in the distance $l$ will be produced. The distance $d_s$ (see FIG. 4) between transmitter-receiver 74 and each hawespipe is a constant for a given mooring system and is a known value, and the distance $d_r$ (see FIG. 4) from each hawespipe to its corresponding sonar reflector also is a constant known value. Since the distance $l$ can be measured by the sonar system described above, the three legs of the triangle shown in FIG. 4 are always known, and ordinary triangulation techniques then can be used to solve for the instantaneous value of the chain angle $\theta'$ (see FIG. 4) at each reflector.

Figure 5:
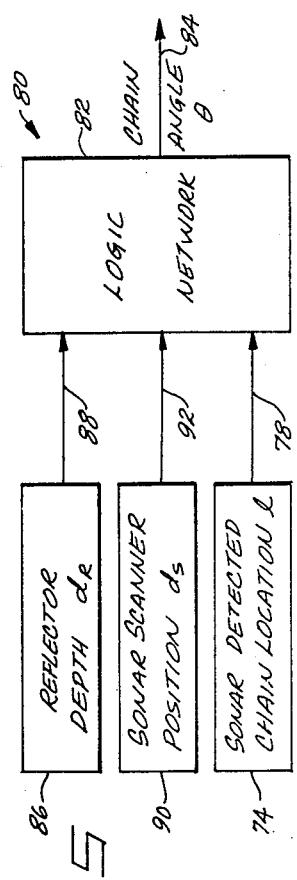
FIG. 5 is a schematic block diagram illustrating an instrumentation system for automatically computing chain angle measured by the sonar of FIG. 4.

The sonic transmitter-receiver 74 generates an electrical output signal 78 representing the instantaneous distance $l$ for each chain of interest. FIG. 5 shows an automated system 80 for obtaining measurements of mooring line tension in each line directly. In this system, sonar output signal 78 is applied directly to a computer 82 which contains a logic network for modulating signal 78 to generate a line tension signal 84 in a manner determined by the logic network and by the output of the associated support signal generators. The support signal generators include an adjustable reflector depth signal generator 86 for producing an output signal 88 representing the value $d_r$ for the mooring line then being monitored for tension. A second adjustable signal generator 90 produces an output signal 92 representing the instantaneous value $d_s$ for each particular mooring line. Signals 78, 88, and 92 are processed by the logic network to generate chain angle 84 which can then be used as the input to system 52 shown in FIG. 3 so as to determine the chain tension in the particular chain of interest.

Thus, active or passive angle measuring means can be submerged far enough below the vessel that wave action is not a handicap in measuring chain angle. The angle measuring means also are located at a level where their angular measurements are a close approximation to the chain angle existing immediately outboard the hawespipe. The resulting chain angle information provides means for accurately determining chain tension, and the system is highly reliable and substantially safe from foreseeable damage in the usual mooring situations.

I claim:

1. In a method ascertaining the tension in a mooring chain extending from a point of support on a vessel in a body of water to an anchor disposed below the surface of the water at a measurable vertical distance from the point of support, the chain having a known submerged weight per unit of length, the improvement comprising:

a. sensing the angle of inclination between the chain and a horizontal reference plane by means of angle sensing means releasably engaged with the chain below the surface of the water at a location on the chain where the angle of inclination sensed from the chain is substantially equivalent to that existing at the point of support, but sufficiently far below the water surface that wave action has a substantially negligible adverse effect on the angle sensing mechanism and the sensed chain angle for providing a substantially accurate indication of the actual tension existing in the chain when an indication of the sensed angle of inclination is combined with indications of said vertical distance and said weight per unit length in a predetermined functional relationship to determine the actual tension present in the chain;
 b. converting the sensed angle of inclination to an output representative of said angle;
 c. converting said output to an indication representative of the tension present in the chain.

2. The method according to claim 1 including modulating said output in accordance with a predetermined functional relationshp by additional signals representative of said vertical distance and said weight per unit length, and applying the modulated signal to means for visually displaying the value thereof in terms of the tension continuously present in the chain.

3. The method according to claim 1 including converting the sensed angle of inclination to an acoustical signal, and thereafter converting the acoustical signal to said output.

4. The method according to claim 3 in which the sensed angle of inclination is converted to a coded acoustical signal which is representative of the sensed chain angle, and including transmitting the coded acoustical signal through the water to an acoustical receiver on the vessel, and decoding the received acoustical signal to generate said output.

5. The method according to claim 1 in which the angle sensing means comprises an active angle sensing device coupled with an acoustic transducer for generating an acoustutical signal representative of the sensed angle of inclination.

6. In a system for use in measuring the tension in a mooring chain extending from a point of support on a vessel in a body of water to a submerged anchor located a measurable vertical distance from the chain point of support, the chain having a known submerged weight per unit length, the apparatus comprising:

a. angle sensing means releasably engaged with the chain at a location below the surface of the water for sensing the angle of inclination between the chain and a horizontal reference plane, said location being at a point on the chain where the angle of inclination sensed from the chain is substantially equivalent to that existing at the point of support, but sufficiently far below the water surface that wave action has a substantially negligible adverse effect on the angle sensing mechanism and the sensed chain angle for providing a substantially accurate indication of the actual tension existing in the chain when an indication of the sensed angle of inclination is combined with indications of said vertical distance and said weight per unit length in a predetermined functional relationship to determine the actual tension present in the chain; and
 b. means for converting the sensed angle of inclination to an output signal representative of the value of said angle, whereby said output signal can be converted into an indication of the tension present in the chain.

7. Apparatus according to claim 6 including means for modulating the output signal in accordance with a predetermined functional relationship by additional signals representative of said vertical distance and said weight per unit length, and means for applying the modulated signal to means for visually displaying the value thereof in terms of the tension continuously present in the chain.

8. Apparatus according to claim 6 including means for converting the sensed angle of inclination to an acoustical signal, and means for converting the acoustical signal to said output signal.

9. Apparatus according to claim 8 including means for converting the sensed angle of inclination to a coded acoustical signal representative of the sensed chain angle, and means for transmitting the coded acoustical signal through water to an acoustical receiver on the vessel, and means for decoding the received acoustical signal to generate said output signal.

10. Apparatus according to claim 6 in which the angle sensing means comprises an active angle sensing device coupled with an acoustic transducer for generating an acoustical signal representative of the sensed angle.

11. In a method for ascertaining the tension in each of a plurality of mooring chains extending from separate points of support on a vessel in a body of water to corresponding anchors disposed below the surface of the water at a measurable vertical distance from the respective points of support of the mooring chains, each chain having a known submerged weight per unit of length, the improvement comprising:

a. sensing the angle of inclination between each chain and a horizontal reference plane by means of separate angle sensing means releasably engaged with the chains at a location below the surface of the water where the angle of inclination sensed from each chain will provide a substantially accurate indication of the actual tension existing in the chain when an indication of the sensed angle of inclination is combined with indications of said vertical distance and said weight per unit length in a predetermined functional relationship to determine the actual tension present in a chain;
 b. converting the angle of inclination sensed by each angle sensing means to separate acoustical signals indicative of each sensed angle of inclination;
 c. transmitting each acoustical signal to transducer means on the vessel for receiving the signals and converting them to corresponding output signals indicative of the angle of inclination of each mooring chain; and d. converting each output signal to an indication representative of the tension present in each chain.

12. The method according to claim 11 including modulating each output signal by respective sets of signals indicative of said vertical distance and said weight per unit length, and applying each modulated signal to means for visually displaying the value thereof in terms of the tension present in the particular chain of interest.

13. The method according to claim 11 in which the acoustical signals are transmitted to respective transducer means on the vessel for receiving the acoustical signals generated by sensing means, and including converting the acoustical signals to corresponding output signals each of which is indicative of the angle of inclination of a respective mooring chain.

14. In a method for ascertaining the tension in a mooring chain extending from a point of support on a vessel in a body of water to an anchor disposed below the surface of the water at a measurable vertical distance from the point of support, the chain having a known submerged weight per unit of length, the improvement comprising:

a. sensing the angle of inclination between the chain and a horizontal reference plane by means of a passive sonar reflector releasably engaged with the chain at a location below the surface of the water where the angle of inclination sensed from the chain will provide a substantially accurate indication of the actual tension existing in the chain when an indication of the sensed angle of inclination is combined with indications of said vertical distance and said weight per unit length in a predetermined functional relationship to determine the actual tension present in the chain;

b. converting the sensed angle of inclination to an output representative of said angle; and c. converting said output to an indication representative of the tension present in the chain.

15. The method according to claim 14 including transmitting a train of sonic pulses between a sonic tranponder onboard the vessel and the sonic reflector to generate a first output representative of the distance between the transponder and the reflector, measuring the distance between the chain point of support and the sonic reflector and generating a second output representative of said distance, measuring the distance between the transponder and the chain point of support and generating a third output representative of said distance, and modulating the first, second, and third outputs in accordance with a predetermined functional relationship to generate an output signal representative of the angular inclination of the mooring chain at the sonic reflector point of attachment thereto.

16. In a system for use in measuring the tension in a plurality of mooring chains extending from separate points of support on a vessel in a body of water to respective submerged anchors located a measurable vertical distance from corresponding chain points of support, each chain having a known submerged weight per unit length, the apparatus comprising:

a. separate angle sensing means releasably secured to each chain at a location below the surface of the water for sensing the angle of inclination between each chain and a horizontal reference plane, said location being at a point on each chain where the angle of inclination sensed from the chain will provide a substantially accurate indication of the actual tension existing in the chain when an indication of the sensed angle of inclination is combined with indications of said vertical distance and said weight per unit of length in a predetermined functional relationship to determine the actual tension present in the chain;

b. means for converting the angle of inclination sensed by each angle sensing means to separate acoustical signals indicative of each sensed angle of inclination;

c. means for transmitting each acoustical signal to transducer means on the vessel for receiving the signals and converting them to corresponding outputs indicative of the angle of inclination of each mooring chain; and d. means for converting each output signal to an indication representative of the tension present in each chain.

17. Apparatus according to claim 16 including means for modulating each output signal by respective sets of signals indicative of said vertical distance and said weight per unit length corresponding to the particular chain of interest, and means for applying each modulated signal to means for visually displaying the value thereof in terms of the tension present in the particular chain of interest.

18. Apparatus according to claim 17 including tranducer means on the vessel for receiving the several acoustical signals and converting them to corresponding outputs indicative of the angle of inclination of each mooring chain.

19. In a system for use in measuring the tension in a mooring chain extending from the point of support on a vessel in a body of water to a submerged anchor located a measurable vertical distance from the chain point of support, the chain having a known submerged weight per unit length, the apparatus comprising:

a. a passive sonic reflector releasably engaged with the chain at a location below the surface of the water for sensing the angle of inclination between the chain and a horizontal reference plane, said location being at a point on the chain where the angle of inclination sensed from the chain will provide a substantially accurate indication of the actual tension existing in the chain when an indication of the sensed angle of inclination is combined with indications of said vertical distance and said weight per unit of length in a predetermined function relationship to determine the actual tension present in the chain; and b. means for converting the sensed angle of inclination to an output signal representative of the value of said angle, whereby said output signal can be converted into an indication of the tension present in the chain.

20. Apparatus according to claim 19 including means for transmitting a train of sonic pulses between a sonic transponder on the ship and the sonic reflector to generate a first output representative of the distance between the transponder and the reflector, means for generating a second output representative of the distance between the chain point of support and the sonic reflector, means for generating a third output representative of the distance between the transponder and the chain point of support, and means for modulating the first, second, and third outputs in accordance with the predetermined functional relationship to generate an output signal representative of the angular inclination of the mooring chain at the sonic reflector point of attachment thereto.

* * * * *